US007925594B2

(12) United States Patent
Jaligama et al.

(10) Patent No.: US 7,925,594 B2
(45) Date of Patent: Apr. 12, 2011

(54) SYSTEM AND METHOD FOR PROVIDING FRAMEWORK FOR BUSINESS PROCESS IMPROVEMENT

(75) Inventors: Prasad Jaligama, Hyderabad (IN); Sangeeta Das, Karnataka (IN); Raghupathi Narayanarao Cavale, Plano, TX (US)

(73) Assignee: Infosys Technologies Ltd., Bangalore (IN)

( * ) Notice: Subject to any disclaimer, the term of this patent is extended or adjusted under 35 U.S.C. 154(b) by 1084 days.

(21) Appl. No.: 11/185,445

(22) Filed: Jul. 19, 2005

(65) Prior Publication Data

US 2007/0021967 A1  Jan. 25, 2007

(51) Int. Cl.
*G06Q 10/00* (2006.01)
*G06Q 90/00* (2006.01)
*G06F 17/00* (2006.01)

(52) U.S. Cl. .......................................... 705/348; 705/500

(58) Field of Classification Search ............... 705/1, 1.1, 705/500, 348
See application file for complete search history.

(56) References Cited

U.S. PATENT DOCUMENTS

| 6,411,936 B1* | 6/2002 | Sanders ........................... 705/10 |
| 2005/0043976 A1 | 2/2005 | Leehman | |
| 2005/0086244 A1 | 4/2005 | Morinville | |
| 2005/0091093 A1* | 4/2005 | Bhaskaran et al. ............... 705/7 |

OTHER PUBLICATIONS

Senan & Jaligama, "ViewPoint: Aligning Enterprise-Level Initiatives with the Strategic Organizational Objectives, by Adopting a Business Process Maturity Driven Framwork," Infosys Technologies Limited, Bangalore, India, May 2005.

* cited by examiner

*Primary Examiner* — Jamisue A Plucinski
*Assistant Examiner* — Michael M Thompson
(74) *Attorney, Agent, or Firm* — Klarquist Sparkman, LLP (57) ABSTRACT

A method for developing a process roadmap for a business system is disclosed. The method includes identifying a business process and determining business goals and key process metrics for the business process. The method further includes measuring process maturity levels of the business process and identifying business process improvement initiatives based on the process maturity levels. Furthermore, the method includes linking the business process to at least one of the business goals and key process metrics, the process maturity levels, and the business process improvement initiatives for developing the process roadmap for the business system.

20 Claims, 8 Drawing Sheets

SOFTWARE 880 IMPLEMENTING
BUSINESS PROCESS IMPROVEMENT
FRAMEWORK

FIG. 8

SYSTEM AND METHOD FOR PROVIDING FRAMEWORK FOR BUSINESS PROCESS IMPROVEMENT

TECHNICAL FIELD

The technical field relates generally to a method for managing business processes. More particularly, the field relates to a business method for creating a roadmap for one or more of functional initiatives, enterprise-wide initiatives, cross enterprise wide initiatives, and ecosystem enterprise initiative.

BACKGROUND

Business process is an ordered series of events, which manage changing of information from one or more sources to one or more destinations. Such sources and destinations may be internal, customer, or partner applications, applied to control how the change of information is accomplished.

Typically, a business process evolves through various stages or pathways. These stages may have different timelines and may have different levels of maturity. These stages take into account the procedural, systems and data related qualities for any enterprise. The objective of an enterprise could be achieved by identifying the stage in which they belong and progressing through these various stages as they progress through the business process.

However, identification of these stages and then progressing through these stages require creating an optimized information technology solution that enables and manages the process. The conventional method is presently not structured in an optimal way, which leads to complexity and time-consumption. In addition to this, currently, business process solution fails to provide adequately, a method of identifying the stage and measuring the maturity of the stage. Furthermore, the current method lacks in developing a framework to guide the enterprise through the various stages.

Accordingly, there is a need for a technique to provide a method for business process integration and provide a roadmap for various business initiatives.

SUMMARY

In one embodiment of the present technique, a method of developing a process roadmap for at least one business system is disclosed. The method includes identifying at least one business process and determining business goals and key process metrics for the at least one business process. The method further includes measuring process maturity levels of the at least one business process and identifying business process improvement initiatives based on the process maturity. Furthermore, the method includes linking at least one of the business process, or the business goals and key process metrics, or the process maturity levels or the business process improvement initiatives, or combinations thereof for developing the process roadmap for the at least one business system.

In another embodiment of the present technique, a system for developing a process roadmap for at least one business system is disclosed. The system includes at least one business process module comprising a plurality of sub processes and an information source module adapted for determining business goals and key process metrics for the at least one business process. The system further includes an identification module adapted for measuring process maturity levels of the at least one business process and a decision module adapted for identifying business process improvement initiation based on the process maturity. Furthermore, the system includes a process connector module adapted for linking at least one of the business process module, or the information source module, or the identification module or the decision module, or combinations thereof for developing the process roadmap for the at least one business system.

The foregoing and other objects, features, and advantages will become more apparent from the following detailed description, which proceeds with reference to the accompanying figures.

DETAILED DESCRIPTION

A business system may include multiple business processes. The various implementation discussed herein are generally operable for improving the business process integration and to provide a roadmap for various business initiatives or business system or enterprise. It should be noted that in the following discussion, business process or enterprise may be used in a similar context throughout the discussion. It should also be noted that the business process includes at least one of functional initiatives or an enterprise wide initiatives or cross enterprise wide initiatives or ecosystem enterprise initiative or combinations thereof. The details of these initiatives will be explained in detail in the subsequent sections to follow.

A business process is an ordered series of events, which manage changing of information from one or more sources to one or more destinations. Such sources and destinations may be internal, customer, or partner applications, applied to control how the change of information is accomplished. The systematic management of business process results in effectively managing the ordered series of events.

Figure 1:
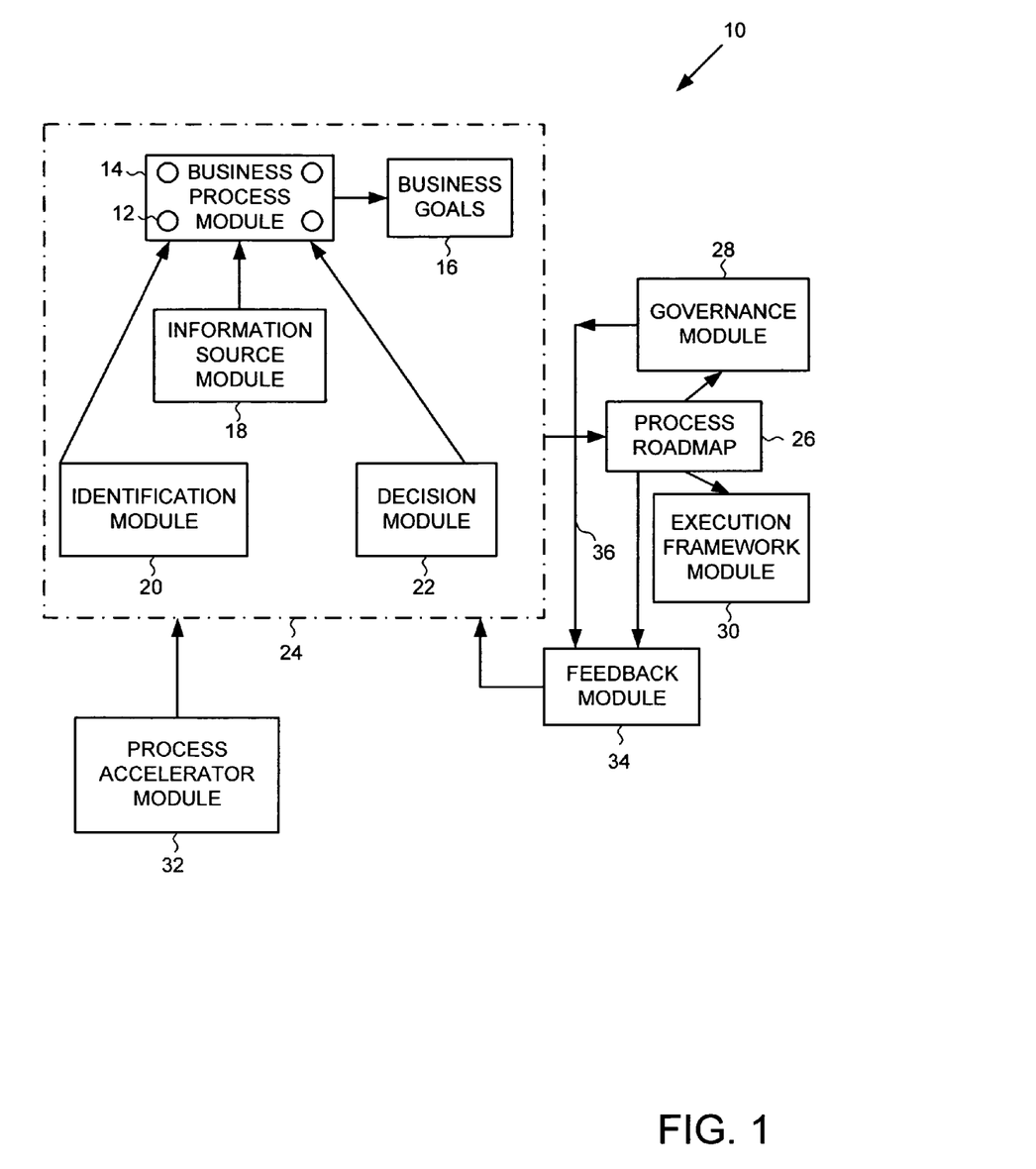
FIG. 1 illustrates a generic block diagram of a system for developing a process roadmap for a business system, in accordance with an aspect of the present technique.

In order to understand and appreciate the various aspects of the present technique, the following sections provide brief introduction to the various aspects of the business process and the implementation of the present technique in any business system. In particular, FIG. 1 illustrates a generic block diagram of a system 10 for developing a process roadmap for a business system, in accordance with an aspect of the present technique. As illustrated, the system 10 includes a business process module 14 having multiple sub-processes 12 within the business process module 14. It should be noted that a business system comprises various business processes and a business process may comprise multiple sub-processes. Further, the business process module 14 may be associated with business goals 16 and related key process metrics.

The system 10 further includes an information source module 18, an identification module 20 and a decision module 22. The information source module 18, the identification module 20, the decision module 22, the business process module 14 and the business goals 16 are linked in various combinations via a process connector module 24 for developing a process road map 26 for the business system. The process roadmap 26 in turn may be associated with the governance module 28 and the execution framework module 30, wherein the governance module 28 and the execution framework module 30 are operable for the effective operation of the process roadmap 26 for the business system.

It should be noted that the information source module 18 may be operable for determining business goals and key process metrics for the business process module. In one implementation of the present technique, the business goals 16 may include at least one of globalization, mergers and acquisitions, real time enterprise or some combinations thereof. The key process metrics may include but is not limited to at least one of the metrics such as order to cash cycle time, faster order fulfillment, low return orders, forecast accuracy and combinations thereof.

As will be appreciated by those skilled in the art, enterprises or business processes around the world are being merged or acquired in quest of enhanced business value, leading to consolidation in the industry. When such business situations occur, organizations initiate globalization programs to integrate the various business processes in each of the enterprise. In such a situation, sometimes the processes of two industries may have to be integrated or may need to be redesigned. Similarly, for acquisitions, processes may need to be extended to the acquired entity or in some situations the processes may also need some change. Likewise, globalization requires integration, consistency and standardization in operations across enterprise and this tends to redefine boundaries across hierarchies, divisions and geographies to evolve new roles and responsibilities.

One of the objectives of the business enterprise or business process is to focus on the above mentioned business goals. It should be noted that though reference is made only to globalization, mergers and acquisitions and real time enterprise, other business goals known in the art and appreciated by people skilled in the art may also be used in certain implementation of the present technique.

The identification module 20 is operable for measuring process maturity levels of the business process module 14. As discussed earlier, every business process progresses through various stages of maturity. These stages may have different timelines and may have different levels of maturity. These stages take into account the procedural, systems and data related qualities for any enterprise. The objective of an enterprise or for that matter any business process could be achieved by identifying the stage in which they belong and progressing through these various stages as they progress through the business process for the business system. The details of the identification module 20 will be explained in detail with reference to FIG. 2.

The process roadmap 26 leads to the governance module 28 and the execution framework module 30. The governance module 28 is operable for program management of the process roadmap 26 for the business system. The governance module 28 translates strategic objectives to project objectives in a formalized manner. Furthermore, the governance module 28 forms a framework that brings in predictability and measurability of implementation for executing the process roadmap 26. In addition to this, the governance module 28 may be considered as a tool for measured approach to process maturity for adopting a clear-cut understanding of current scenarios and the foreseeable results of process improvement initiatives.

In one implementation of the present technique, the governance module 28 may include but is not limited to business objectives and scope settings, project organization structure definition, and management of time, cost and resources. The governance module 28 ensures quality of deliverables and establishes a change control mechanism. In addition to this, the governance module 28 also provides risk management. In other words, the governance module 28 creates and obtains acceptance of work plans, ensures clear ownership and accountability, creates and maintains decision expediting channel and manage expectations of the stake holders.

It is imperative to deploy tools and techniques to measure process maturity. Performance benchmarks and key performance indicators (KPI) may be set up to adhere to desired levels of process maturity for business goals. The governance module 28 translates these KPIs to project objectives. Tracking and monitoring mechanisms may be put in place to gauge the progress of process improvements on a periodic basis. In certain implementations of the present technique, enterprises may use process accelerator module 32 operable for reducing time for implementation of the process roadmap 26.

As indicated earlier, the system 10 further includes the execution framework module 30 operable for implementation of process consultation and information technology development. Further, the execution framework module 30 may enable initiatives, thus leveraging global delivery model. Global delivery model refers to the philosophy of breaking pieces of work into logical components and distributing these components in various locations to execute them where it creates the maximum value.

In one embodiment of the present technique, the execution framework module 30 may include but is not limited to application implementation, interface development and application data exchange connectivity, data migration, infrastructure planning and network planning. In other words, the execution framework module 30 optimizes schedule and budget, identifies and quantifies the risks and identifies risk owners and mitigation strategies.

In certain implementation of the present technique, the process connector module 24 is operable for linking a business process module 14 to at least one of the business goals 16 and key process metrics, the process maturity levels, the business process improvement initiatives or combinations thereof for developing the process roadmap 26 for the business system. The process roadmap 26 will be further explained in the sections to follow.

In one embodiment of the present technique, the system 10 further includes, a feedback module 34 operable to provide a mechanism to constantly monitor and validate the process maturity level using the process roadmap 26 and the business goals 16 and key process metrics of the business process module 14. This feedback module 34 helps to constantly monitor the progress of the business process after the implementation of the process roadmap 26 has begun and measures the levels of maturity to constantly improve implementation of the process road map, if need be. This also helps in monitoring real-time improvements in the business process. In another implementation of the present technique, the feedback may be obtained from the governance module 28 as indicated by reference numeral 36.

Figure 2:
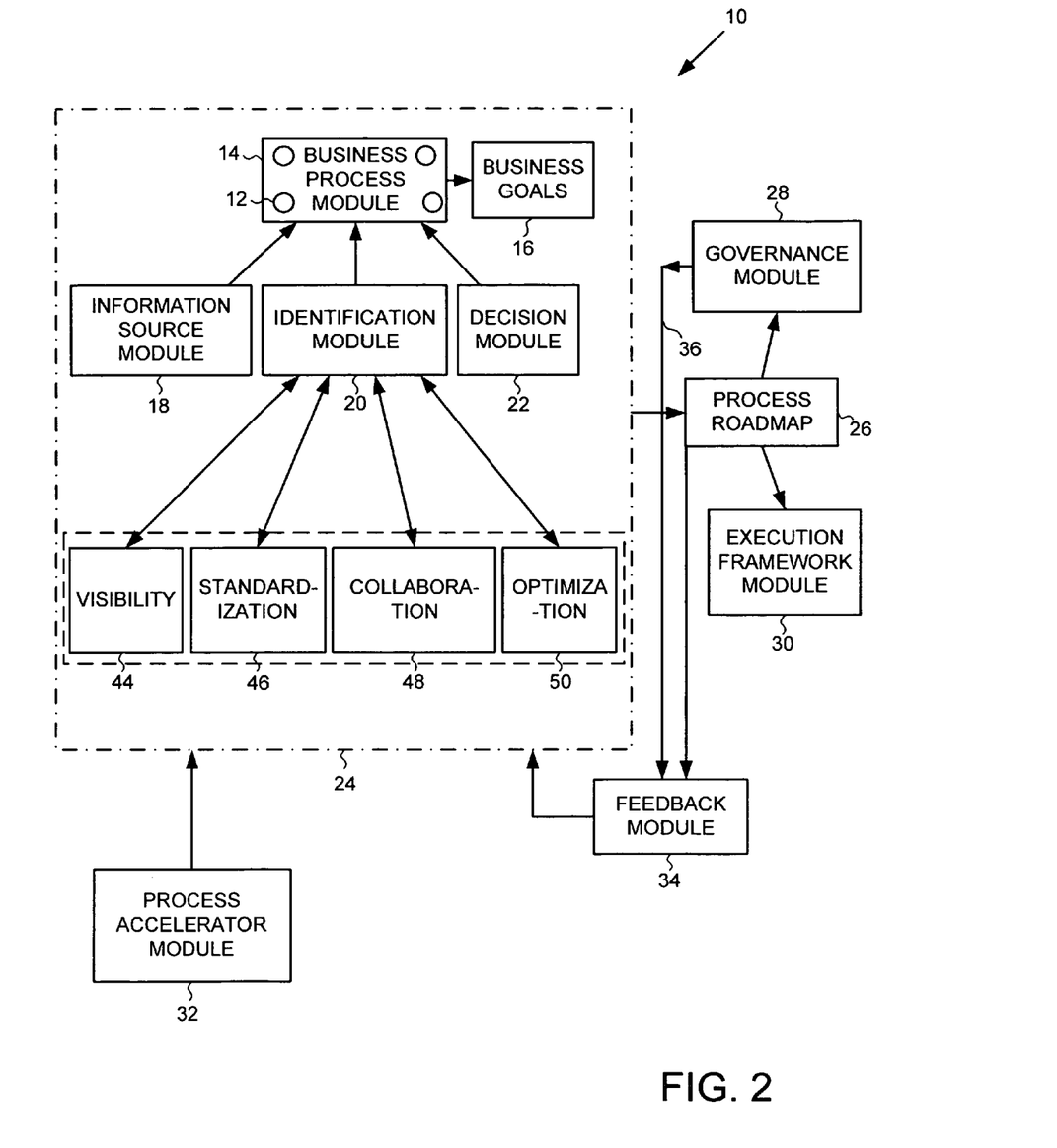
FIG. 2 is a block diagram of a system illustrating process maturity levels of the system of FIG. 1, in accordance with an aspect of the present technique.

While the preceding discussions generally relate to the system 10 for developing a process roadmap 26 for a business system, FIG. 2 is a block diagram of a system 42 illustrating process maturity levels of the system 10 of FIG. 1, in accordance with an aspect of the present technique. As illustrated in FIG. 2, the system 42 includes all the modules as illustrated with reference to FIG. 1 and the functionalities of all the modules are also similar to FIG. 1. By way of example, the system 42 includes the identification module 20 and the business process module 14.

In one implementation of the present technique, the identification module 20 identifies the process maturity level of the business process 14. In one aspect of the technique, the maturity levels are measured with respect to one or more of business process improvement categories such as visibility 44, standardization 46, collaboration 48, optimization 50 and some combination thereof. Visibility may be defined as the extent to which one can ascertain and access reliable and accurate information from a system or application that enables the process under consideration. Standardization may be defined as the extent to which standard methods and tools are used for data exchange as well as process flows. Collaboration may be defined as the extent to which data, process and systems are shared with high degree of accuracy. Optimization may be defined as the extent to which processes and systems are optimized to deliver peak performance and aligned to your Organizational goals.

It should be noted that for a single business process, having various sub-processes, all the sub-processes may be at different maturity levels or the same maturity levels. Furthermore, the business process may be also in any of the maturity levels. The identification module 20 is configured for identifying these maturity levels of the business process and their sub-processes.

In one embodiment, business process improvement initiatives includes, establishing the activities to be performed in enterprise functions such as Human Resources, Finance, Marketing & Sales, and Supply Chain so that the cost involved in these operations can be minimized while maximizing the business benefit. The business process improvement initiatives can also relate to re-designing or redeploying new information technology (IT) applications and infrastructure or fine-tuning the existing IT applications and infrastructure. Other business process improvement initiatives may relate to management of information and/or data of the enterprise transactions. Some other business process improvement initiatives can also relate to organization-wide deployment of the initiatives to be implemented by training the business and IT users.

The implementation of the various business process improvement initiatives can be prioritized based on exemplary factors such as cost, business value and the process maturity levels to which the key process metrics are attainable.

As illustrated in FIG. 1 and as explained earlier, the system 42 includes the process connector module 24 operable for linking the business process 14 with the related business goals and key process metrics, the process maturity levels, the business process improvement initiatives, or combinations thereof for developing the process roadmap for the business system. The process roadmap 26 provides a logical set of intermediate deliverables so that the process transformations are gradual and continuous. The roadmap 26 may cover the spectrum of process initiatives ranging from functional, enterprise, through cross-enterprise to eco system focus to deliver process improvement recommendations and solutions along the roadmap aligned with organizational goals. The roadmap presents a measurable approach to process improvements that contribute toward the business goals 16 as explained earlier.

The process roadmap 26 ensures that the business system realizes strategic objectives. In one embodiment of the present technique, the roadmap 26 aligns multi-year, multiple initiatives to strategic business goals along the roadmap, providing a coordinated approach to business process initiatives. In a second embodiment of the present technique the roadmap 26 enables the business system to manage complexity by modularizing strategic objectives, leading to well defined process initiatives targeting specific objectives. In a third embodiment of the present technique the roadmap 26 allows a continuous rollout of business processes to a maturity level higher than the current, thus achieving long term results in a steady and phased manner.

In a fourth implementation of the present technique, the roadmap 26 represents each initiative in the roadmap 26 to process maturity, enabling a better decision-making business process so that initiatives are prioritized to ultimately serve organizational goals. In a fifth embodiment of the present technique, the roadmap 26 equips business users with the new or improved business processes as and when the components of the initiatives are ready instead of waiting for the entire initiative to be completed. In addition to this, the roadmap 26 also provides a timely feedback mechanism to make changes to the initiatives and ensures a gradual business transformation. In a sixth embodiment of the present technique, the roadmap 26 incorporates changes in business process objectives as modified process initiatives into the roadmap 26, providing a flexible roadmap 26 that is adaptable as various business systems evolve with time. The framework 26 comes in handy as a barometer for periodic measurement of process maturity levels. The business system thus benefit from a closed-loop management process to define, direct and measure the successful implementation of process improvements in their journey towards business goals.

It should be noted that though reference is made to the above mentioned embodiments of the present technique, as will be appreciated by people skilled in the art, any other similar embodiments may also be used to implement the present technique.

Figure 3:
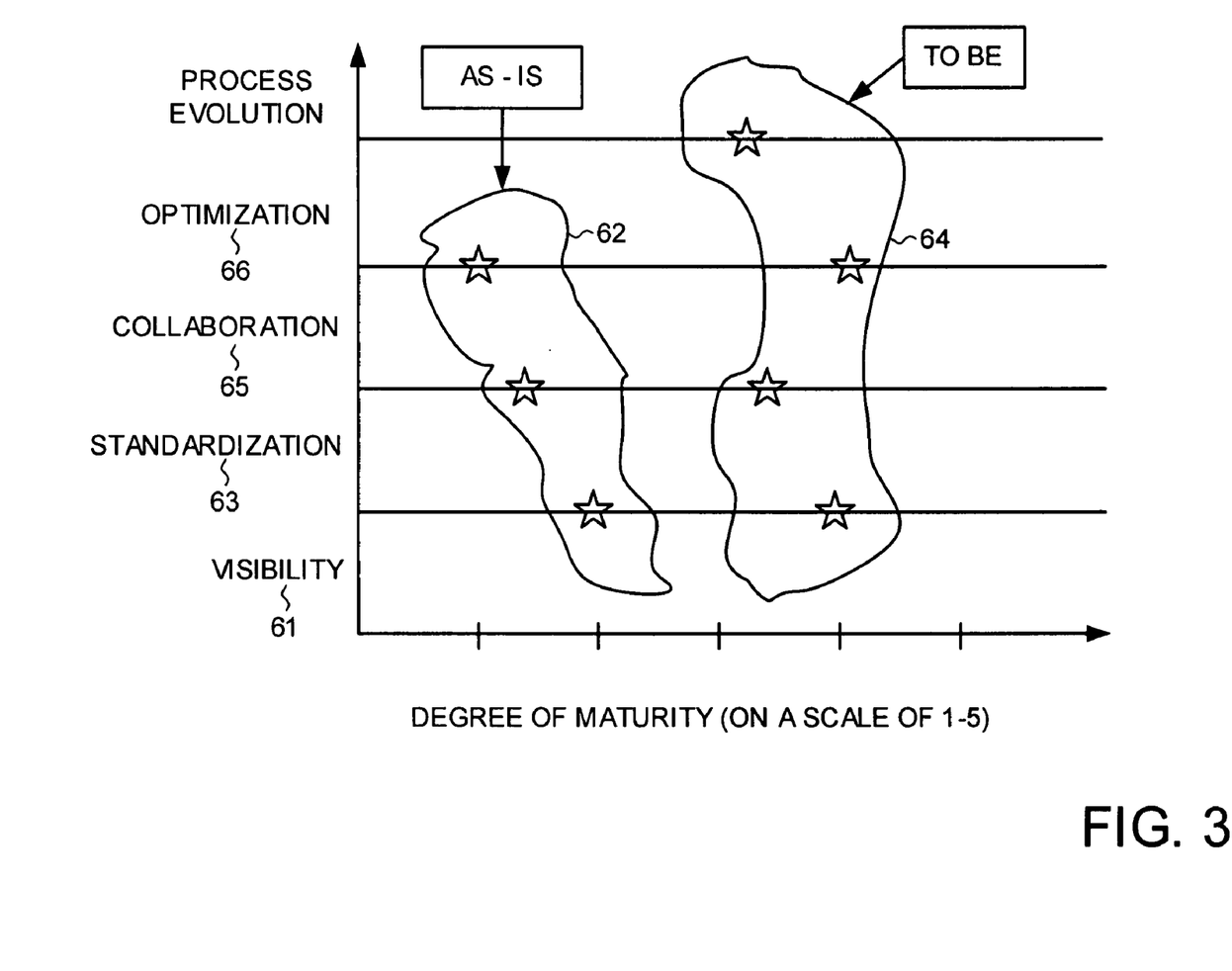
FIG. 3 is a block diagram illustrating exemplary As-Is and To-Be maturity levels of exemplary processes along the categories of Visibility, Standardization, Collaboration and Optimization.

FIG. 3 is graphical representation of process maturity assessment for determining a road map comprising a combination of business process initiatives to be implemented to a current as-is assessment at 62 to the objective levels at to-be assessment at 64. The x-axis depicts the exemplary maturity levels for each of the exemplary categories of business process evolution such as visibility 61, standardization 63, collaboration 65 and optimization 66. An exemplary road would among other things list business process initiatives to move the process maturity level along in each of the categories visibility 61, standardization 63, collaboration 65 and optimization 66. Thus an exemplary roadmap may comprise one or more business process initiatives to move the visibility maturity level from somewhere near a 2 to a 4 as shown in FIG. 3. Similarly, other business initiatives may address the gap in other categories from a as-is state at 62 to to-be state at 64.

Figure 4:
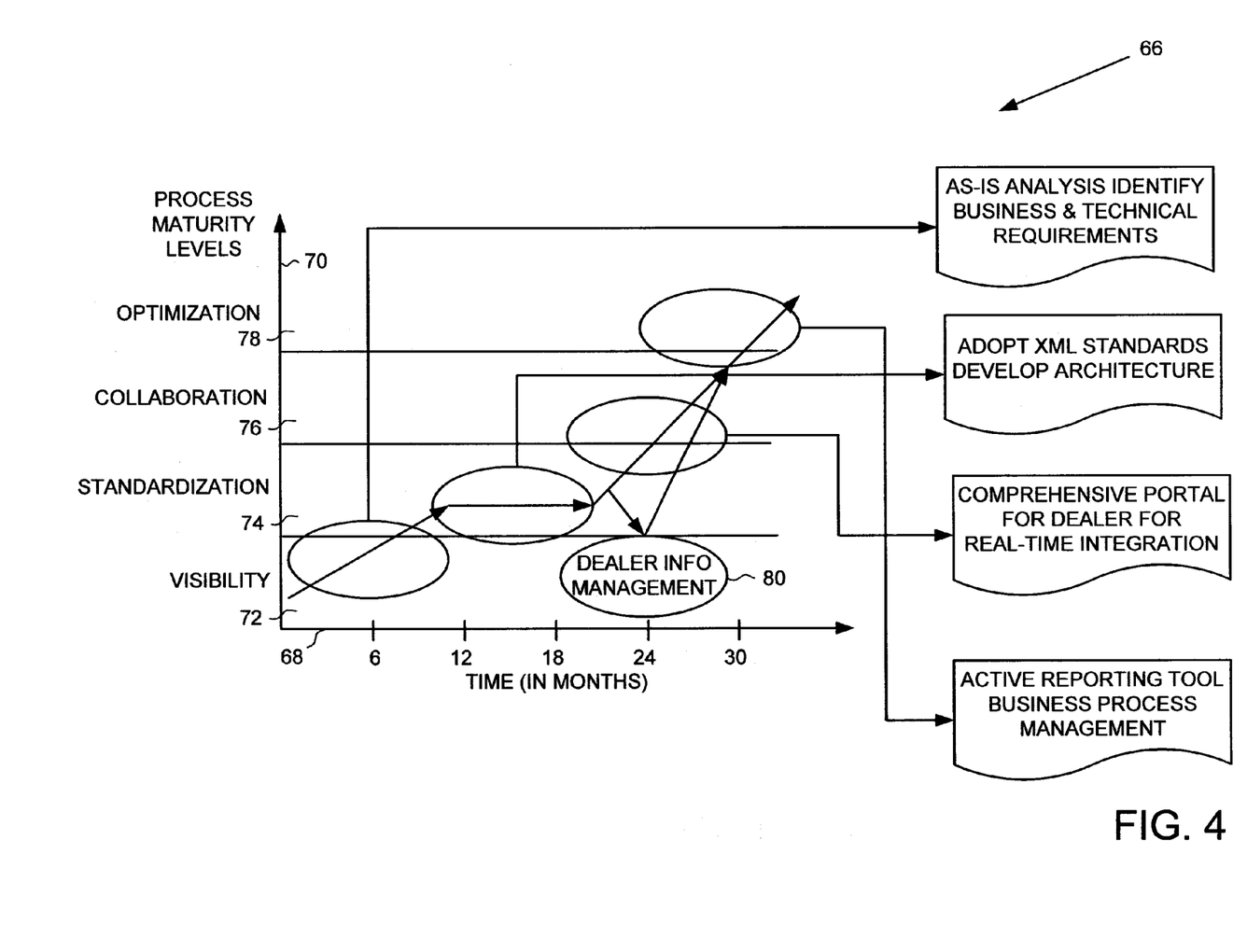
FIG. 4 is a graphical representation, illustrating process maturity levels with respect to time period, in accordance with an aspect of the present technique.

FIG. 4 is a graphical representation 66 illustrating process maturity levels with respect to a time period, in accordance with an aspect of the present technique. As illustrated in FIG. 4, the X axis represents the time in months 68 and the Y axis represents the process maturity levels 70. The illustration represents the progress of the enterprise through these various process maturity levels in various course of time.

In one implementation of the present illustration, at the visibility level 72 at the time of about six months time, an as-is analysis together with identifying regional business and technical requirements may be done. At the visibility level 72, the business process may have the ability to access and retrieve information from the business system. In addition to this, the business process at this level 72 may have the ability to keep abreast of information about diverse businesses, products, locations and functions.

At the next level, the business process may progress from visibility level to standardization level 74 in approximately about twelve months time. At standardization level 74, the business process may integrate various processes and adhere to the best practice of various industries both in terms of technology and also operating the various processes. At this stage, the business process may adopt XML (extensive markup language) standards and develop common global architecture with regional modifications. In addition to this, at this level, the business process may be consolidating and synchronizing key value chain activities like procure to pay, order to cash, people to paycheck, etc.

Likewise, at the transition between the standardization levels 74 to collaboration level 76, the business process may adopt a comprehensive portal for dealer/channel partner interactions and also have business process application integration for real-time integration. In addition to this, the business process at the collaboration level 76 may have the ability to integrate with various internal as well as external partners. In one implementation of the present technique, at this standardization level 74 of collaboration, the business process may be leveraging capabilities by collaborating with value chain partners on product development, supply chain management, knowledge management & shared services. It may take about twenty four months from the time of inception to reach to this level.

Finally, at the level of optimization 78, which may take about thirty months time from inception, the enterprise may have an activity reporting tool and a standardized business process management system. At the optimization level 78, the various processes are expected to operate at peak performance using minimal resources. In other words, at this collaboration level 78, the business process is in a state of continuous improvement.

By way of another example, in another embodiment of the present technique, the transition to higher maturity level may occur through the implementation of dealer information management 80 at the visibility level 72. In other words, the transition occurs from the standardization level 74 to the visibility level 72 through the implementation of the dealer information management 80. This may take about twenty four months from the time of inception.

As will be appreciated by people skilled in the art, though reference is made to the above cited criteria for each levels of maturity, however, many similar criteria known in the art may also be included at each levels of maturity to determine the process maturity level of the business process. It should also be noted that the levels could also differ within a business' functional areas such as supply chain management, engineering etc.

Figure 5:
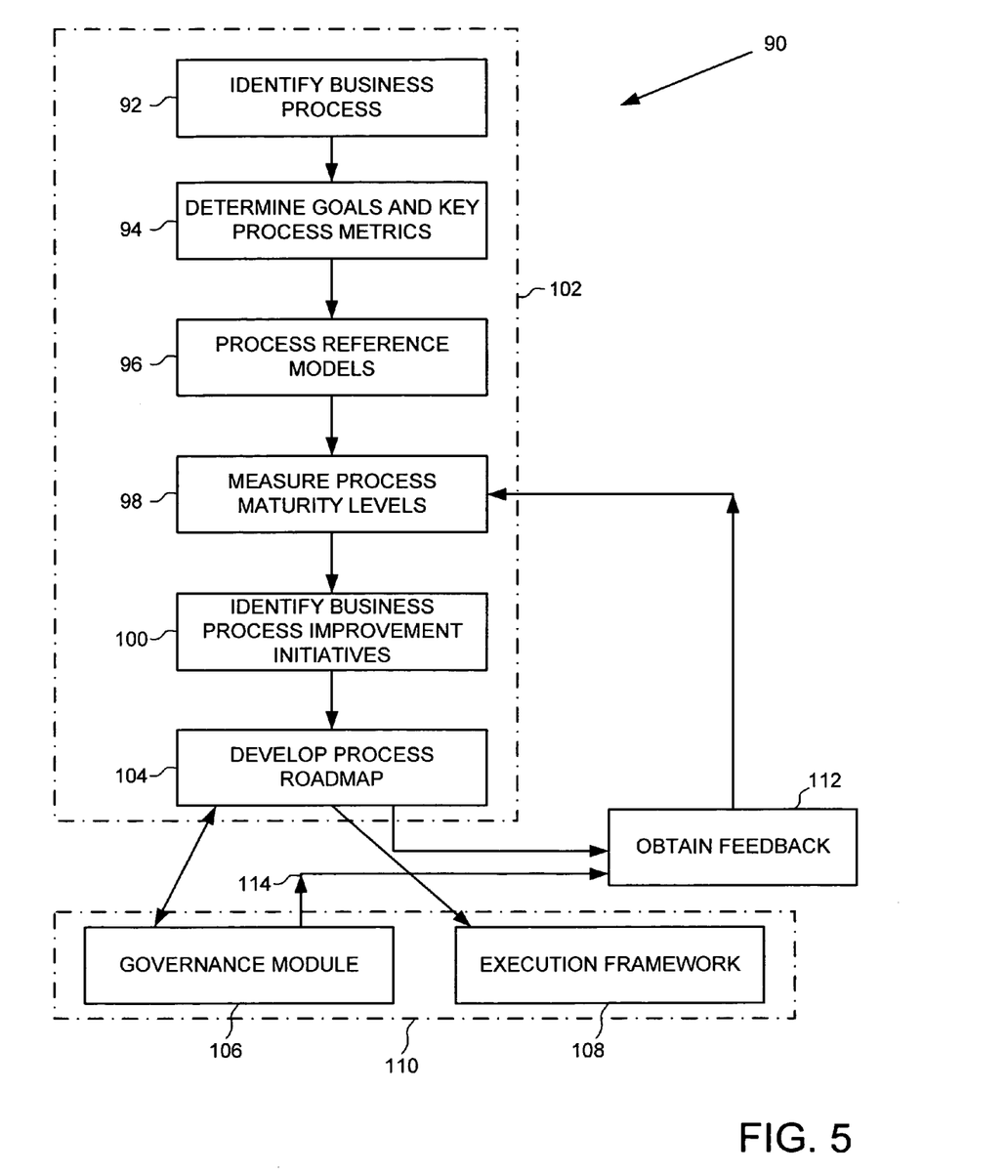
FIG. 5 is a flowchart illustrating a method of developing a process roadmap for a business system, in accordance with an aspect of the present technique.

FIG. 5 is a flowchart illustrating a method 90 of developing a process roadmap for a business system, in accordance with an aspect of the present technique. The method starts in step 92 by identifying at least one business process for a business system. A single business process may also include various sub processes. Also, the method 90 may be applied with respect to multiple business processes and multiple business systems. At step 94, the business goals and key process metrics are determined for the business process. This is generally executed in form of answers to various questionnaires. The method continues in step 96, by providing process reference models, wherein the problem statements are identified. Data from a relevant industry analysis may also be included in creating the process reference model for determining the problem statement in the. At step 98, the process maturity levels are measured for the business process. This step identifies the business process and categorizes the business process in a particular level of maturity.

The process 98 of measuring maturity levels are based on the following exemplary guidelines that may be followed in determining the maturity levels. The following guidelines provide a framework for asking the right questions so that the assessment of the processes can be made along the dimensions of visibility, standardization, collaboration and optimization. Gap analysis between as-is state (e.g., 62 in FIG. 3) and to-be state (e.g., 64 in FIG. 3) is done keeping these guidelines in mind and process improvement initiatives for addressing the gap are developed accordingly.

At least some of the following exemplary aspects are to be addressed for determining the visibility maturity level:
  Data Availability
  Ease of access
  Security/Control
  Ease of maintenance
  Reliability/Accuracy
  Real time availability of data.

At least some of the following exemplary aspects are to be addressed for determining the standardization maturity level. The guidelines may be categorized at the process, system and data as follows:
  Process
  Single way of doing things
  Use of Templates and Methodologies
  System
  Standard terminology
  Industry standards
  Data & Instance consolidation
  Data
  Common technology platform, Common development language
  Common Architecture and Design
  Standard tools At least some of the following exemplary aspects are to be addressed for determining the collaboration maturity levels:
  Information Sharing
  Extending the process—Process Streamlining and sharing (ownership of data/process)
  Common technological platform.

At least some of the following exemplary aspects are to be addressed for determining the Optimization maturity levels:
  KPI determination
  Target KPI determined
  System Collection of KPIs
  KPI Driven Process Analysis
  Process Improvement
  System adaptability to process changes
  Organizational alignment
  Enterprise Agility.

After the determination of the maturity levels the method 90 continues in step 100, wherein the business process improvement initiatives are identified based on the process maturity levels. It should be noted that the business process, or the business goals and key process metrics, or the process maturity levels or the business process improvement initiatives, or combinations thereof are linked together as indicated by reference numeral 102 for developing the process roadmap for the at least one business system. This is indicated in step 104. As explained earlier in detail, the process roadmap presents a measurable approach to process improvements that contribute toward business goals such as globalization, mergers and acquisitions and real-time enterprise. Finally, the process roadmap is guided by the governance module 106 and the execution framework 108. In other words, the governance module and the execution framework module work in conjunction with each other to achieve the operation of the process roadmap. This is represented by reference numeral 110.

In one embodiment of the present technique, a feedback loop may also be provided to constantly monitor and validate the progress towards attaining the desired process maturity levels based on the implementation of the process roadmap and the goals and key process metrics of the business process. This is generally indicated by reference numeral 112. Further, feedback is obtained from the governance module as indicated by reference numeral 114. The above feedback mechanism helps to constantly monitor and validate the process roadmap and helps to guide the business system to identify the need for further improvement of the business process through the various levels of maturity. In addition to this, the feedback mechanism also helps in monitoring real-time improvements in the business process for any business system.

The following paragraphs illustrate an exemplary implementation of at least some of the methods and systems discussed above. The illustration begins with introduction of business enterprise. Let us consider an exemplary case of a global firm that intends to bring together three different manufacturing business units and three different product lines operating in three different countries. The company feels that by merging these three entities, it can leverage cross-sell and up-sell opportunities in its product lines and also cut down the cost of support and maintenance. Some of the business challenges of the company can be as follows:

The three legal entities have common clientele. The company wants to give their clients a uniform experience and capitalize on cross-sell and up-sell opportunities.

There is poor visibility into large turn-key projects. Top management is not able to track project revenue, project costs, escalations and progress in various projects.

The prime business challenge is to streamline the business processes and practices across these three units to leverage the synergies across three countries.

There is a need to streamline vendor management, reduce costs and overheads in procurement and leverage its buying power with a large pool of common suppliers across the three entities.

There is a need to increasing competitive pressure to effectively engage distribution channels through Business To Business (B2B) Portals.

Exemplary inputs to process assessment (e.g., 98 of FIG. 5) may be one or more of the following data:

1. Current process documentation of all enterprise processes (e.g., Customer Relations Management, Finance, Human Resources, Short Cycle Management and IT Systems) of the three business units in the three countries.

2. Current process performance metrics such as but not limited to market share, repeat customers, cross-sell, up-sell opportunity and conversion.

3. Organizational goals such as, streamlining the business processes and practices across the three units to leverage the synergies across 3 countries.

4. Process performance goals such as reduction in cost of operations, increase in sales from cross-sell and up-sell opportunities.

5. A timeframe over which the organization wants the goals to be attained such as 2 years, for instance.

Resources (e.g., time, money and people) available to improve the processes.

Figure 6:
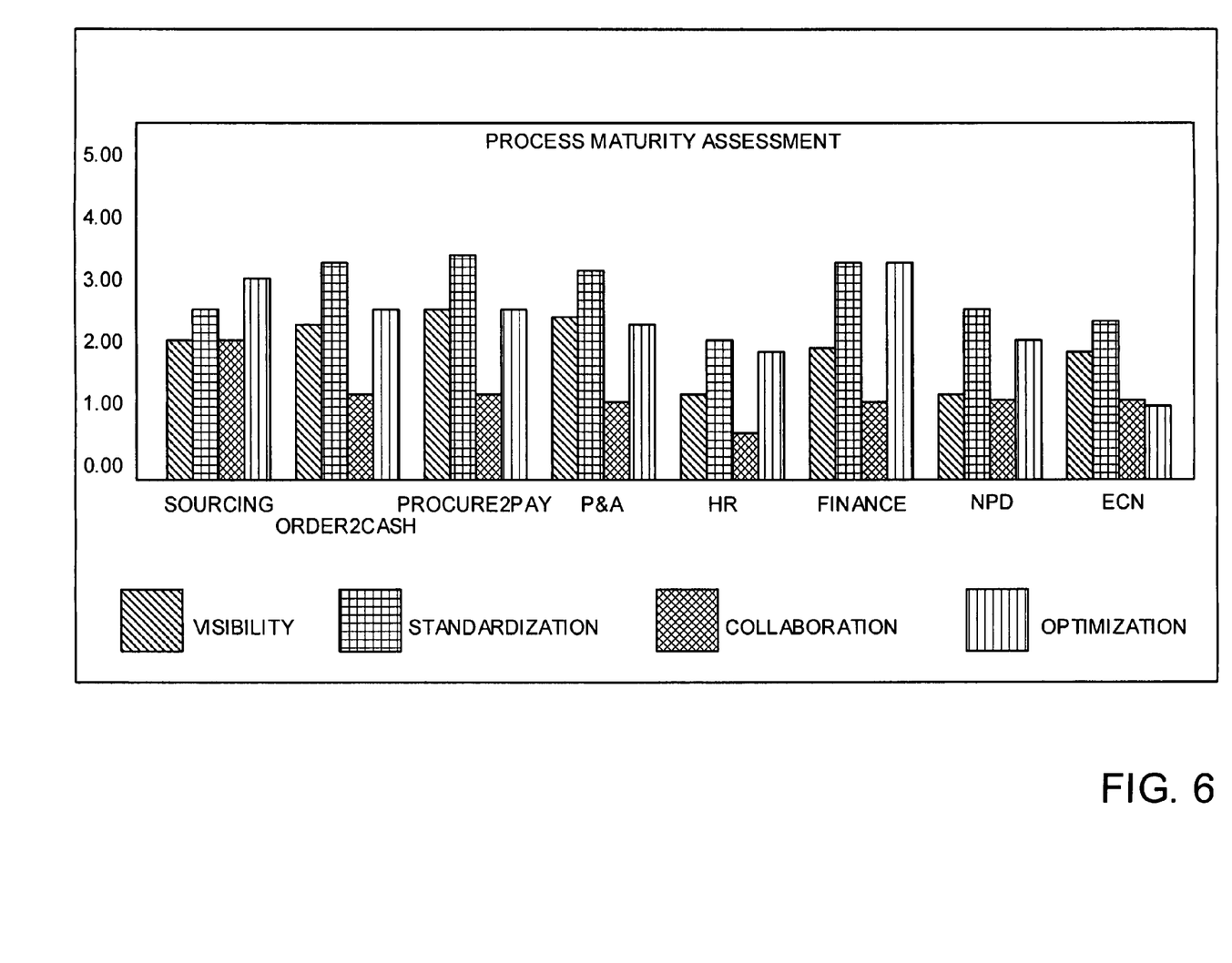
FIG. 6 is a block diagram illustrating a graphical representation of a current or As-Is maturity level of a exemplary business process.
Figure 7:
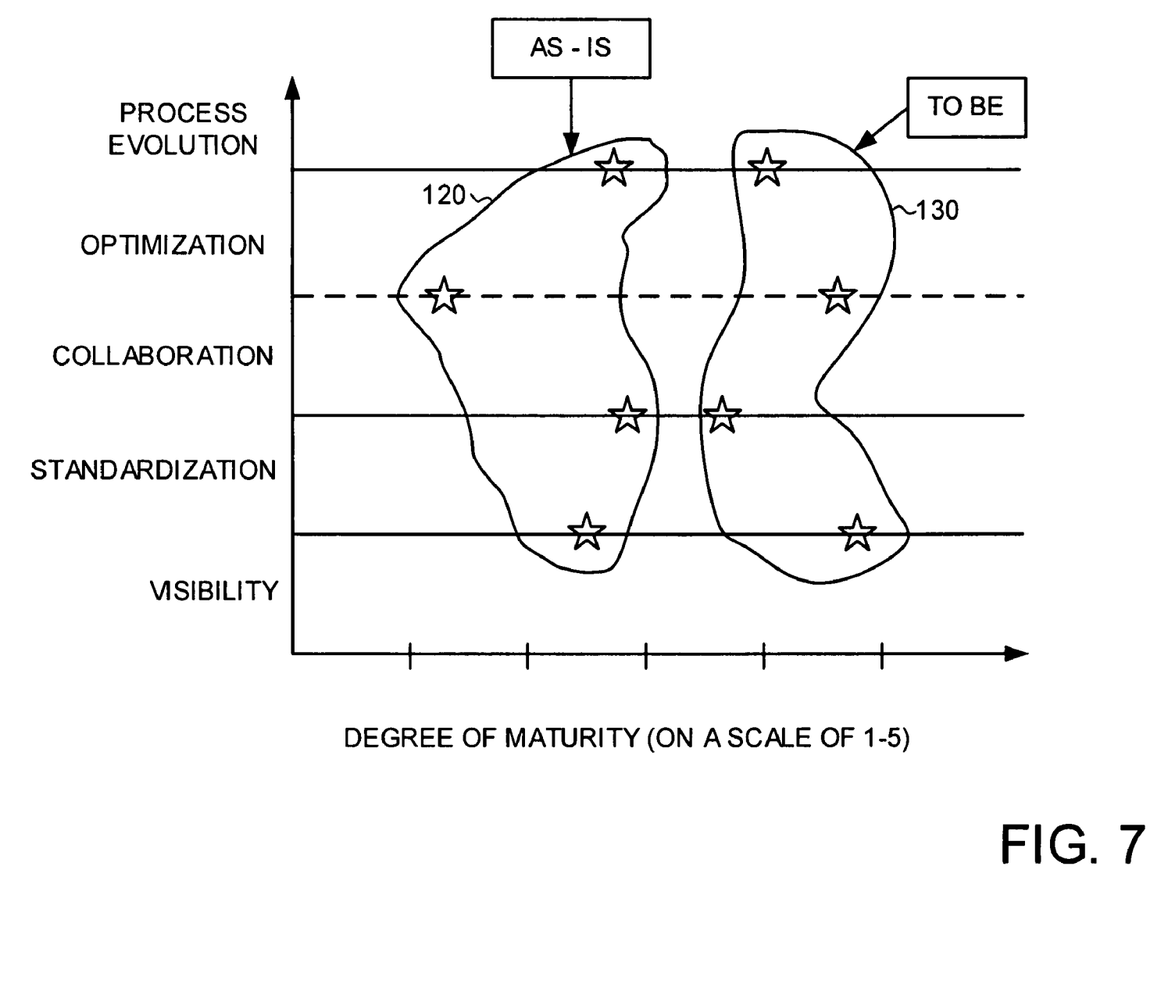
FIG. 7 is a block diagram, illustrating a graphical representation of As-Is and To-Be maturity levels of an exemplary business process for determining a gap between an existing state to a goal.

The outputs of process maturity assessments (e.g., 98 in FIG. 5) desirably are indicators of the maturity of the process along the dimensions of visibility, standardization, collaboration and optimization. FIG. 6 illustrates a chart listing current or As-Is maturity levels for an exemplary business process assessment. For instance the assessment of a process may indicate 75% visibility, 50% standardization, 45% collaboration and 30% optimization. This provides an indication as to the degree of potential improvement possible in the process along those four dimensions of visibility, standardization, collaboration and optimization. For example, as shown in FIG. 6, the Order to Cash process maturity is 2.5 on a scale of 5. This indicates that the current visibility of orders and hence, the opportunity for improvement is 50%. This is considering all the cross-sell/up-sell opportunities. Hence, there is a scope for 50% improvement in visibility of Order to Cash. Similarly, Standardization score for Order to Cash is around 60%, Collaboration is 30% and Optimization is 60%. Using the Organizational goals and process performance goals (e.g., such goals as 20% reduction in cost of operations and 20% increase in sales from cross-sell and up-sell opportunities), an estimate is prepared as to the desired degree of visibility, standardization, collaboration or optimization in the process. A gap that is to be bridged is established along the four dimensions so that To-Be state is achieved from an As-Is state. FIG. 7 illustrates the gap between an As-Is state 120 to a To-Be state 130 along each category. Recommendations are made to bridge the gap along each dimension. A list of process improvement initiatives is generated. Table 1 below lists an exemplary list of initiatives for addressing the assessed gap in each of the categories of Visibility, Standardization, Collaboration and Optimization.

TABLE 1

| Process Maturity Stage | Gap | Initiatives |
| --- | --- | --- |
| Visibility | Customer and Account related information stored in a fragmented way across business units. | Portfolio Analysis, Enterprise Data model and Process/data flow re-engineering |
| Visibility & Standardization | Lack of real-time integration across systems to pull together an integrated view. | Standardize processes across business units - Global Rollouts |
| Standardization | Business Unit performance reported in different ways in different regions | Enterprise Application Integration for real-time integration |
| Collaboration | Absence of a single front end to find all data - seamless working between applications to support this (process integrations) | Customer Information Portals B2B Portals and Vendor Consolidation |
| Optimization | Not just historical financial reporting, but also futuristic planning and forecasting for General Managers | Enterprise Reporting and Planning systems Business Intelligence |

TABLE 1-continued

| Process Maturity Stage | Gap | Initiatives |
|---|---|---|
| | Exploration of Cross-sell and Up-sell Opportunities arising from customer data integrity | |

Once the list of process improvement initiatives is determined it is prioritized and scheduled over a period of time (depending on a schedule of when the organization wants the gaps to be filled). The resources required to implement the initiatives is estimated and based on this a roadmap of initiatives is prepared as a plan for implementing the process improvement initiatives to be taken up over a period of time. The program management and governance structure is prepared to carry out the recommended initiatives. Table 2 below illustrates a matrix describing some data used in a roadmap for addressing the gap.

TABLE 2

| Time period | Stage of Maturity | KPIs are tracked | Stakeholders involved |
|---|---|---|---|
| 6 months | Visibility | Single view of customer/account information: 85% visibility | IT Program Managers |
| 12 months | Visibility & Standardization | Standardized processes across regions - lower cost of operations and management: 70% standardization | CIOs, CXOs, IT Program Managers |
| 18 months | Standardization | | |
| 24 months | Collaboration | Lower cost of sourcing. Increase in sales through the portal: 80% collaboration | CXO, CIO, IT program managers |
| 30 months | Optimization | Single view of opportunities; Better demand planning: 70% Optimization | CXO, CIO, IT Program Managers |

An execution framework (e.g., 108 in FIG. 5) is provided for IT enablement of the processes when the processes are re-engineered. The execution framework is an approach to implement the process improvement initiatives. The initiatives can be efficiently executed by breaking pieces of work into logical components and distributing these components geographically to perform them where it creates the maximum value.

Figure 8:
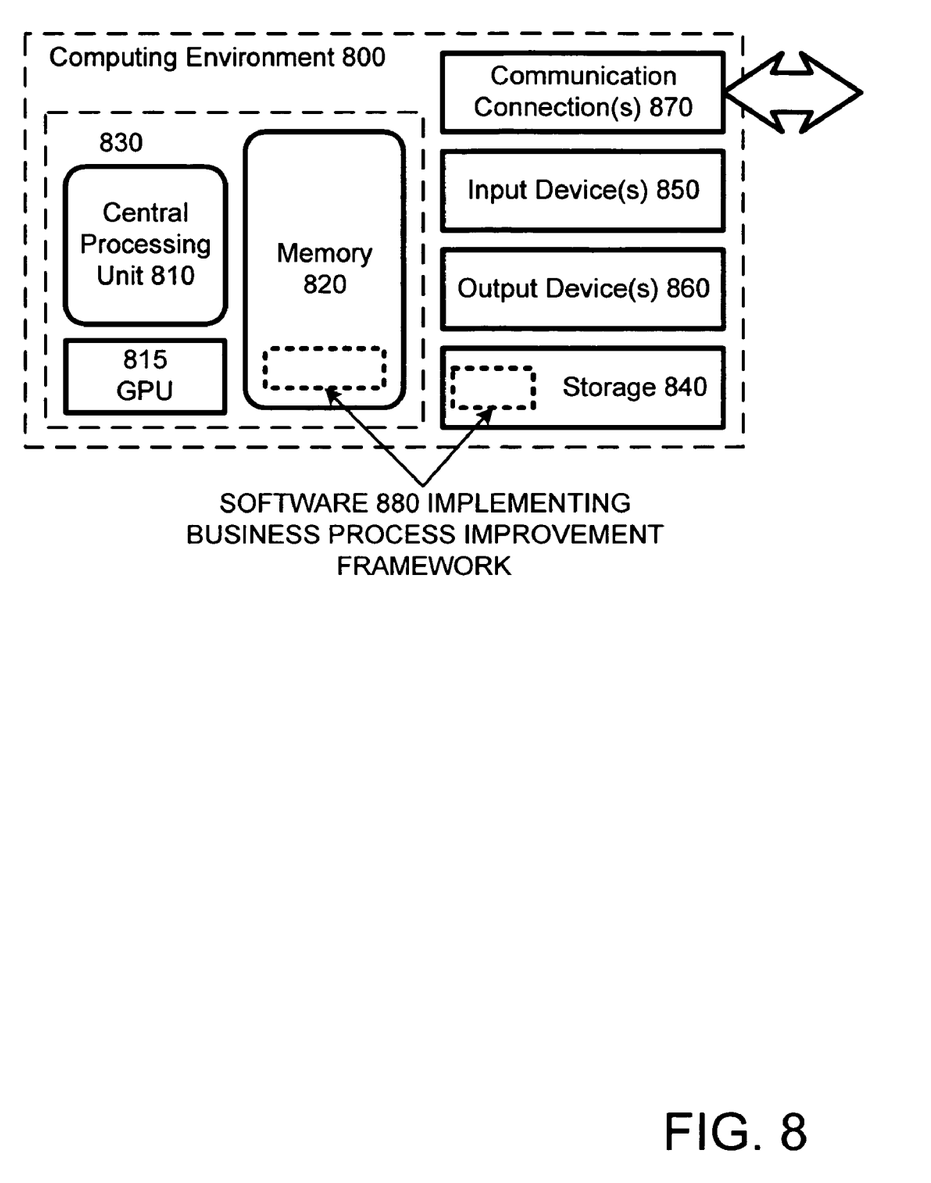
FIG. 8 is a block diagram illustrating an exemplary computing environment for implementing the methods of triangulating procedural geometric objects.

FIG. 8 and the following discussion are intended to provide a brief, general description of an exemplary computing environment in which the disclosed technology may be implemented. For instance, any of the functionalities described with respect to linking at least one of the business process with the information source module, the identification module, the decision module, or combinations thereof using a process connector module to develop the process roadmap for the at least one business system can be implemented in such a computing environment. Although not required, the disclosed technology was described in the general context of computer-executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including hand-held devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

As will be appreciated by those of ordinary skilled in the art, the foregoing example, demonstrations, and method steps may be implemented by a suitable computer program implemented as computer executable code on a processor based system, such as general purpose or special purpose computer (FIG. 8). It should also be noted that different implementations of the present technology may perform some or all the steps described herein in different orders or substantially concurrently, that is, in parallel. Furthermore, the functions may be implemented in a variety of programming languages. Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code.

The sequence of instructions as explained in the method steps may include but is not limited to, program code adapted for identifying at least one business process including a plurality of sub-processes and program code adapted for determining business goals and key process metrics for the at least one business process using an information source module. The sequence of instructions may further include program code adapted for measuring process maturity levels of the at least one business process using an identification module and program code adapted for identifying business process improvement initiation based on the process maturity levels using a decision module. Furthermore, the sequence of instructions may include program code adapted for linking at least one of the business process, or the information source module, or the identification module or the decision module, or combinations thereof using a process connector module to develop the process roadmap for the at least one business system. In one implementation of the present technique, the sequence of instructions may include program code adapted for monitoring business process improvement based on the process roadmap.

It should be noted that the sequence of instructions may include program code adapted for mapping the process maturity against a process metric module and a program code adapted for prioritizing business process improvement initiatives based on cost, business value and the process maturity level to which the key process metrics are attainable. It should be note that though reference is made to the above mentioned code adapted to execute a predefined sequence of instructions, as will be appreciated by people skilled in the art; other similar code adapted to achieve similar results as explained in the present technique may also be implemented.

With reference to FIG. 8, an exemplary system for implementing the disclosed technology includes a general purpose computing device in the form of a conventional PC 800, including a processing unit 802, a system memory 804, and a system bus 806 that couples various system components including the system memory 804 to the processing unit 802. The system bus 806 may be any of several types of bus structures including a memory bus or memory controller, a peripheral bus, and a local bus using any of a variety of bus architectures. The system memory 804 includes read only memory (ROM) 808 and random access memory (RAM) 810. A basic input/output system (BIOS) 812, containing the basic routines that help with the transfer of information between elements within the PC 800, is stored in ROM 808.

The PC 800 further includes a hard disk drive 814 for reading from and writing to a hard disk (not shown), a magnetic disk drive 816 for reading from or writing to a removable magnetic disk 817, and an optical disk drive 818 for reading from or writing to a removable optical disk 819 (such as a CD-ROM or other optical media). The hard disk drive 814, magnetic disk drive 816, and optical disk drive 818 are connected to the system bus 806 by a hard disk drive interface 820, a magnetic disk drive interface 822, and an optical drive interface 824, respectively. The drives and their associated computer-readable media provide nonvolatile storage of computer-readable instructions, data structures, program modules, and other data for the PC 800. Other types of computer-readable media which can store data that is accessible by a PC, such as magnetic cassettes, flash memory cards, digital video disks, CDs, DVDs, RAMs, ROMs, and the like, may also be used in the exemplary operating environment.

A number of program modules may be stored on the hard disk 814, magnetic disk 817, optical disk 819, ROM 808, or RAM 810, including an operating system 830, one or more application programs 832, other program modules 834, and program data 836. For instance, one or more files comprising instructions related to performing the methods of providing extensible software development services as described herein including, according to a specific execution environment, may be among the program modules 834. A user may enter commands and information into the PC 800 through input devices, such as a keyboard 840 and pointing device 842 (such as a mouse). Other input devices (not shown) may include a digital camera, microphone, joystick, game pad, satellite dish, scanner, or the like. These and other input devices are often connected to the processing unit 802 through a serial port interface 844 that is coupled to the system bus 806, but may be connected by other interfaces, such as a parallel port, game port, or universal serial bus (USB) (none of which are shown). A monitor 846 or other type of display device is also connected to the system bus 806 via an interface, such as a video adapter 848. Other peripheral output devices, such as speakers and printers (not shown), may be included.

The PC 800 may operate in a networked environment using logical connections to one or more remote computers, such as a remote computer 850. The remote computer 850 may be another PC, a server, a router, a network PC, or a peer device or other common network node, and typically includes many or all of the elements described above relative to the PC 800, although only a memory storage device 852 has been illustrated in FIG. 8. The logical connections depicted in FIG. 8 include a local area network (LAN) 854 and a wide area network (WAN) 856. Such networking environments are commonplace in offices, enterprise-wide computer networks, intranets, and the Internet.

When used in a LAN networking environment, the PC 800 is connected to the LAN 854 through a network interface 858. When used in a WAN networking environment, the PC 800 typically includes a modem 860 or other means for establishing communications over the WAN 856, such as the Internet. The modem 860, which may be internal or external, is connected to the system bus 806 via the serial port interface 844. In a networked environment, program modules depicted relative to the personal computer 600, or portions thereof, may be stored in the remote memory storage device 852. The network connections shown are exemplary, and other means of establishing a communications link between the computers may be used.

Many modifications of the present invention will be apparent to those skilled in the arts to which the present invention applies. Further, it may be desirable to use some of the features of the present invention without the corresponding use of other features. Accordingly, the foregoing description of the present invention should be considered as merely illustrative of the principles of the present invention and not in limitation thereof. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims. As will be appreciated by a person skilled in the art, the various implementations of the present technique provide a variety of advantages. For example, the method may be faster, cheaper, and provide better solutions than the existing method. Secondly, the method leverages on existing knowledge repository and process accelerators to reduce time for implementation of the roadmap. Thirdly, the method may result in risk-mitigated project implementations and predictable project delivery.

While the following description is presented to enable a person of ordinary skill in the art to make and use the invention and it is provided in the context of the requirement for a obtaining a patent. The present description is the best presently-contemplated method for carrying out the present technology. Various modifications to the preferred embodiment will be readily apparent to those skilled in the art and the generic principles of the present technique may be applied to other embodiments, and some features of the present technology may be used without the corresponding use of other features. Accordingly, the present technique is not intended to be limited to the embodiment shown but is to be accorded the widest scope consistent with the principles and features described herein.

We claim:

1. A method of developing a process roadmap for at least one business system using a computer system to perform the following operations comprising:

identifying at least one business process;

determining business goals and key process metrics for the at least one business process;

measuring process maturity levels of the at least one business process, wherein measuring the process maturity levels comprises measuring a visibility maturity level, that at least indicates the extent that information is ascertainable from at least one system of the at least one business process, the measuring the visibility maturity level comprises (a)-(f):

(a) evaluating data availability of the at least one system of the at least one business process;

(b) evaluating ease of access of the at least one system of the at least one business process;

(c) evaluating security of the at least one system of the at least one business process;

(d) evaluating ease of maintenance of the at least one system of the at least one business process;

(e) evaluating reliability of the at least one system of the at least one business process; and (f) evaluating real time availability of data of the at least one system of the at least one business process;

identifying well defined business process improvement initiatives based on the measured process maturity levels that comprise the visibility maturity level, wherein the business process improvement initiatives comprise activities determined to minimize cost and maximize benefit for the at least one business process; and developing a process roadmap for the at least one business system, the developing the process roadmap comprises linking the at least one business process to at least one of the business goals and key process metrics, the process maturity levels and the business process improvement initiatives.

2. The method as recited in claim 1, wherein the at least one business process comprises a plurality of sub processes, each having an association with at least one business process or other sub-processes.

3. The method as recited in claim 1, wherein the business goals comprises at least one of globalization, or mergers and acquisitions, or real time enterprise, or combinations thereof.

4. The method as recited in claim 1, wherein the process maturity levels comprise at least one selected from the group consisting of:
standardization, collaboration, and optimization.

5. The method as recited in claim 1, wherein the key process metrics are configured for mapping the process maturity levels against a process metric module.

6. The method as recited in claim 1, wherein the business process improvement initiatives are prioritized based on cost, business value and process maturity level to which the key process metrics are attainable.

7. The method as recited in claim 1, further comprising: implementing the process roadmap using a governance module.

8. The method as recited in claim 1, further comprising monitoring business process improvement based on the process roadmap using a feedback control module.

9. The method as recited in claim 1, wherein the at least one business process includes at least one of functional initiatives or enterprise wide initiatives or cross enterprise wide initiatives or ecosystem enterprise initiative or combinations thereof.

10. A system for developing a process roadmap for at least one business system comprising at least one business process, comprising:
a computer with at least one processor;
computer-executable instructions stored on tangible machine readable storage media causing the at least one processor to implement at least one business process module comprising a plurality of sub processes;
computer-executable instructions stored on tangible machine readable storage media causing the at least one processor to implement an information source module operable for determining business goals and key process metrics for the at least one business process module;
computer-executable instructions stored on tangible machine readable storage media causing the at least one processor to implement an identification module operable for measuring process maturity levels of the at least one business process, wherein the measured process maturity levels comprise a visibility maturity level that at least indicates the extent that information is ascertainable from at least one system of the at least one business process;
computer-executable instructions stored on tangible machine readable storage media causing the at least one processor to implement a decision module operable for identifying well defined business process improvement initiatives based on the measured process maturity levels that comprise the visibility maturity level, wherein the business process improvement initiatives comprise activities determined to minimize cost and maximize benefit for the at least one business process; and
computer-executable instructions stored on tangible machine readable storage media causing the at least one processor to implement a process connector module operable for linking the at least one business process to at least one of the business goals and key process metrics, the process maturity levels and the business process improvement initiatives to develop the process roadmap for the at least one business system;
wherein measuring the visibility maturity level comprises evaluating data availability, ease of access, security, ease of maintenance, reliability, and real time availability of data of the at least one system of the at least one business process.

11. The system as recited in claim 10, wherein the business goals comprises at least one of globalization, or mergers and acquisitions, or real time enterprise, or combinations thereof.

12. The system as recited in claim 10, wherein the process maturity levels include at least one of standardization, or collaboration, or optimization, or combinations thereof.

13. The system as recited in claim 10, wherein the business process improvement initiatives are prioritized based on cost, business value and process maturity level to which the key process metrics are attainable.

14. The system as recited in claim 10, further comprising a governance module operable for implementation of the process roadmap.

15. The system as recited in claim 10, wherein the at least one business process includes at least one of functional initiatives or an enterprise wide initiatives or cross enterprise wide initiatives or ecosystem enterprise initiative or combinations thereof.

16. The system as recited in claim 10, further comprising a feedback control module operable for monitoring business process improvement based on the process roadmap.

17. A computer storage device tangibly embodying a plurality of computer-executable instructions, the plurality of computer-executable instructions causing a computer to perform a method for developing a process roadmap for at least one business system, the method comprising:
identifying at least one business process including a plurality of sub-processes;
determining business goals and key process metrics for the at least one business process using an information source module;
measuring process maturity levels of the at least one business process using an identification module, wherein the measured process maturity levels comprise a visibility maturity level that at least indicates the extent that information is ascertainable from at least one system of the at least one business process;
identifying well defined business process improvement initiatives based on the measured process maturity levels that comprise the visibility maturity level using a decision module, wherein the business process improvement initiatives comprise activities determined to minimize cost and maximize benefit for the at least one business process; and
linking the at least one business process to at least one of the business goals and key process metrics, the process maturity levels and the business process improvement initiatives to develop the process roadmap for the at least one business system;

wherein measuring the visibility maturity level comprises:

evaluating data availability of the at least one system of the at least one business process;

evaluating ease of access of the at least one system of the at least one business process;

evaluating security of the at least one system of the at least one business process;

evaluating ease of maintenance of the at least one system of the at least one business process;

evaluating reliability of the at least one system of the at least one business process; and evaluating real time availability of data of the at least one system of the at least one business process.

18. The computer storage device as recited in claim 17, wherein the method further comprises:

mapping the process maturity levels against a process metric module.

19. The computer storage device as recited in claim 17, wherein the method further comprises:

prioritizing business process improvement initiatives based on cost, business value and process maturity level to which the key process metrics are attainable.

20. The computer storage device as recited in claim 17, Previously Presented further comprises:

monitoring business process improvement based on the process roadmap.

* * * * *

UNITED STATES PATENT AND TRADEMARK OFFICE
CERTIFICATE OF CORRECTION

PATENT NO.        : 7,925,594 B2
APPLICATION NO.   : 11/185445
DATED             : April 12, 2011
INVENTOR(S)       : Jaligama et al.

It is certified that error appears in the above-identified patent and that said Letters Patent is hereby corrected as shown below:

On the Title Page: Item (56) References Cited:

Under Other Publications:

"Framwork" should read --Framework--.

In the Drawings:

Fig. 2, "10" should read --42--.

In the Specification:

Column 1, lines 11-12, "initiative" should read --initiatives--.

Column 1, line 62, "sub processes" should read --sub-processes--.

Column 2, line 45, "implementation" should read --implementations--.

Column 2, line 52, "an enterprise wide initiatives" should read --enterprise-wide initiatives--.

Column 2, line 53, "initiative" should read --initiatives--.

Column 3, line 29, "is" should read --are--.

Column 3, line 39, "enterprise" should read --enterprises--.

Column 3, lines 53-54, "implementation" should read --implementations--.

Column 4, line 24, "manage" should read --manages--.

Column 4, line 52, "implementation" should read --implementations--.

Column 5, line 42, "includes" should read --include--.

Column 6, line 4, "eco system" should read --ecosystem--.

Column 6, line 40, "system" should read --systems--.

Column 6, line 49, "is graphical" should read --is a graphical--.

Column 7, lines 39 and 55-56, "twenty four" should read --twenty-four--.

Signed and Sealed this
Fifteenth Day of May, 2012

David J. Kappos
*Director of the United States Patent and Trademark Office*

CERTIFICATE OF CORRECTION (continued)
U.S. Pat. No. 7,925,594 B2

Column 7, lines 58 and 60, "each levels" should read --each level--.

Column 7, line 59, "maturity, however, many" should read --maturity, many--.

Column 7, line 62, "business'" should read --business's--.

Column 7, lines 63-64, "engineering etc." should read --engineering, etc.--.

Column 8, line 3, "sub processes" should read --sub-processes--.

Column 8, line 12, "statement in the." should read --statement.--.

Column 8, lines 39-49, under Process, "System" and "Data" should be indented.

Column 9, line 16, "numeral 110" should read --numeral 110.--

Column 9, line 56, "to increasing" should read --to increase--.

Column 10, line 9, "Resources" should read --6. Resources--.

Column 11, line 14, "is" should read --are--.

Column 11, line 14, "and based on this a" should read --and, based on this, a--.

Column 12, lines 10 and 20, "ordinary skilled" should read --ordinary skill--.

Column 12, line 11, "example" should read --examples--.

Column 12, line 53, "note that" should read --noted that--.

Column 12, line 55, "art; other" should read --art, other--.

Column 14, line 27, "While the" should read --The--.

Column 14, lines 29-30, "for a obtaining a patent" should read --for obtaining a patent--.

In the Claims:

Column 15, claim 2, line 14, "sub processes" should read --sub-processes--.

Column 15, claim 3, line 18, "goals comprises" should read --goals comprise--.

Column 15, claim 9, line 40, "initiative" should read --initiatives--.

Column 15, claim 10, line 49, "sub processes" should read --sub-processes--.

Column 16, claim 11, line 20, "goals comprises" should read --goals comprise--.

Column 16, claim 15, line 34, "an enterprise wide initiatives" should read --enterprise-wide initiatives--.

Column 16, claim 15, line 35, "initiative" should read --initiatives--.

Column 18, claim 20, line 11, "Previously Presented" should read --wherein the method--.